E. H. LICHTENBERG.
LOADING AND MEASURING APPARATUS.
APPLICATION FILED DEC. 23, 1916.
1,287,711.
Patented Dec. 17, 1918.
3 SHEETS—SHEET 1.
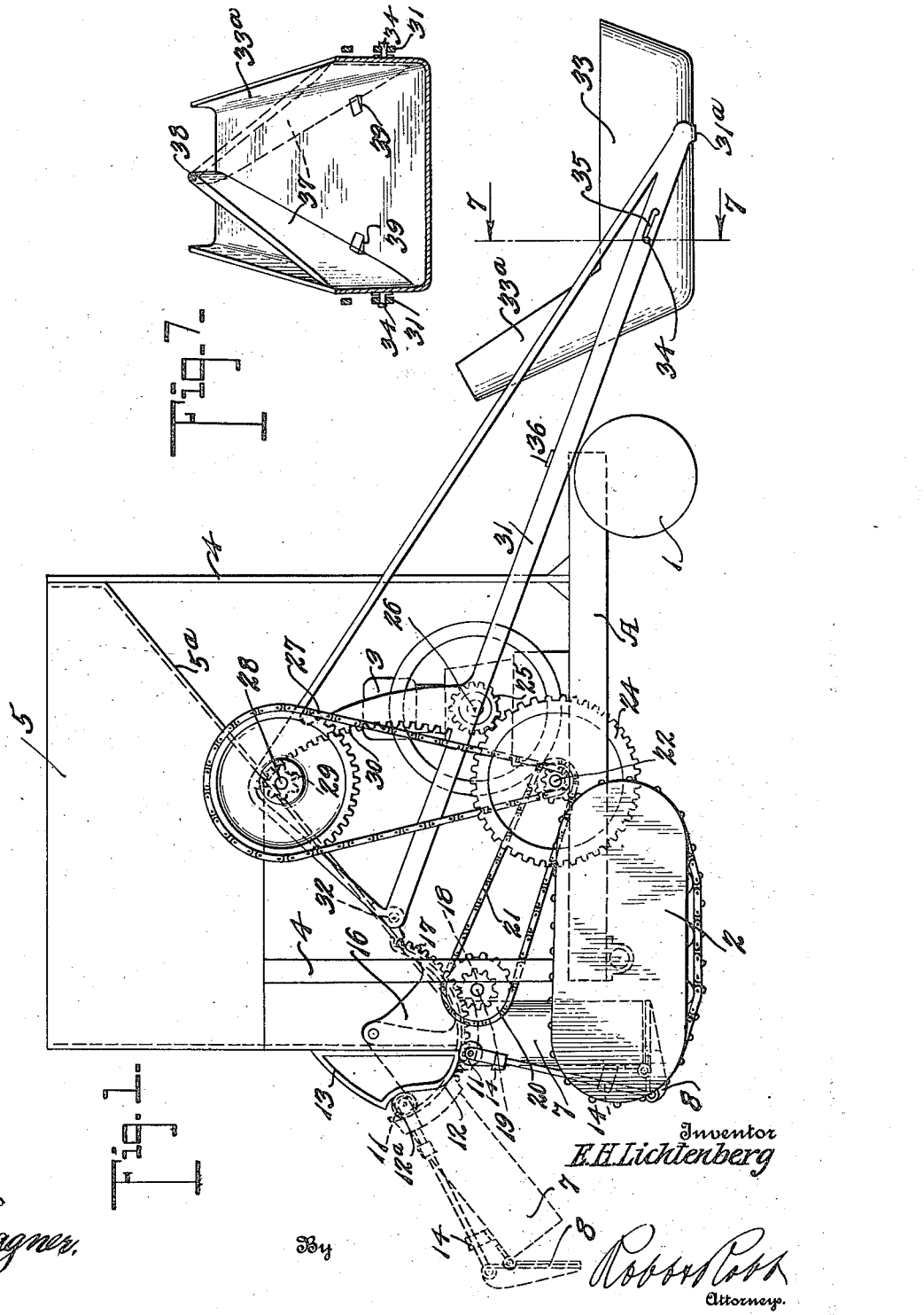
Witness
E. H. Wagner.
Inventor
E. H. Lichtenberg
By Robert Ross
Attorney.

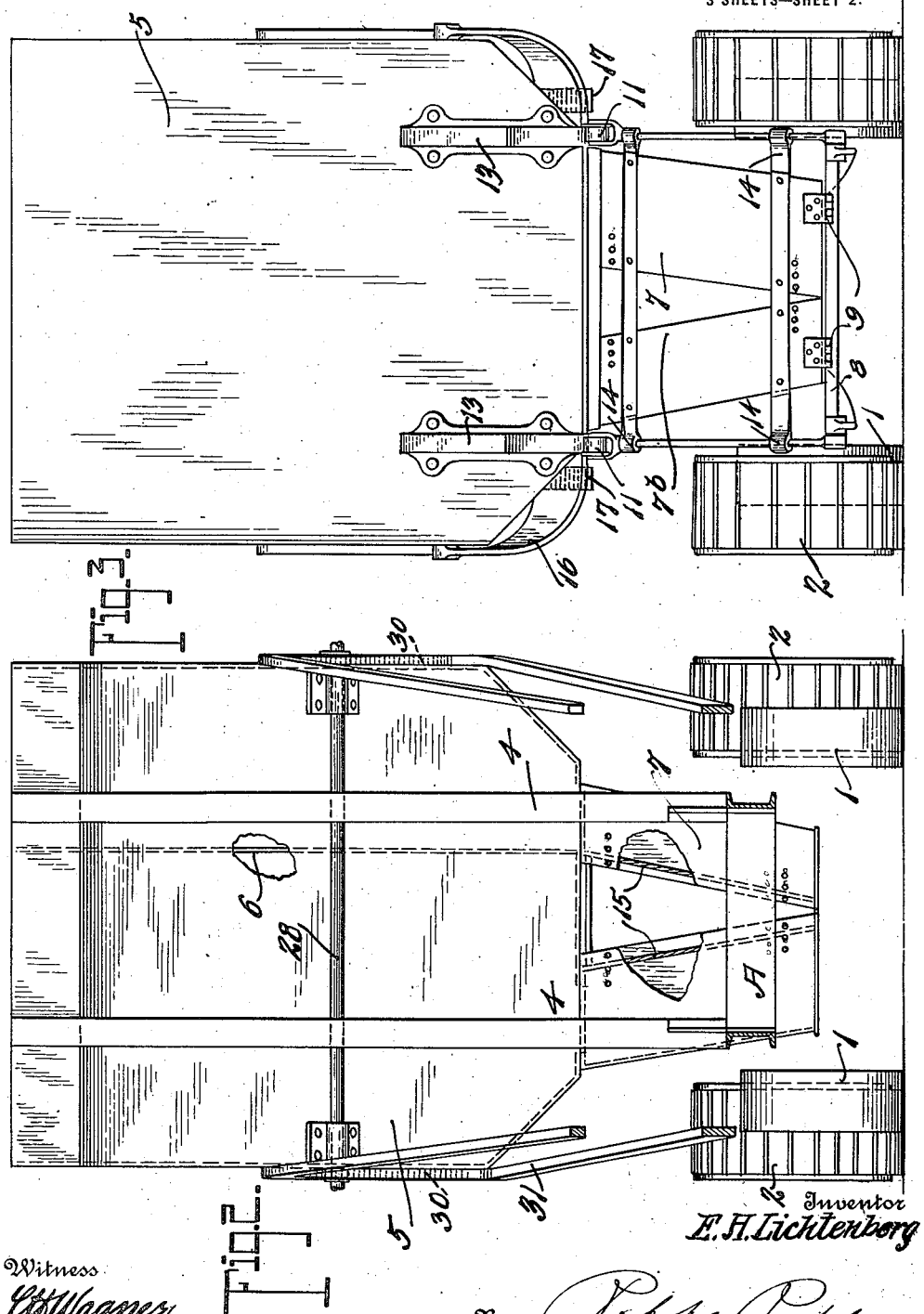

E. H. LICHTENBERG.
LOADING AND MEASURING APPARATUS.
APPLICATION FILED DEC. 23, 1916.
1,287,711.
Patented Dec. 17, 1918.
3 SHEETS—SHEET 3.
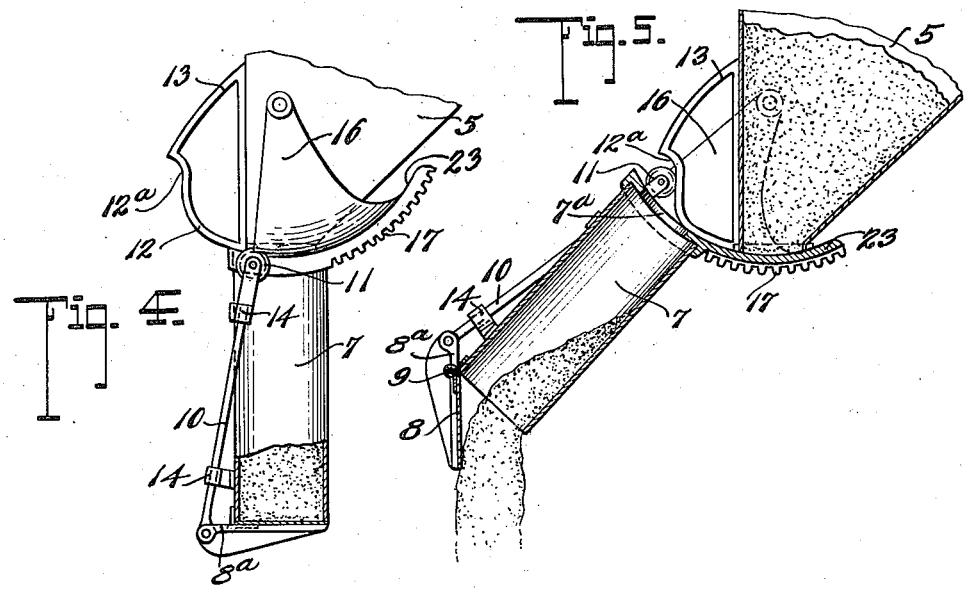
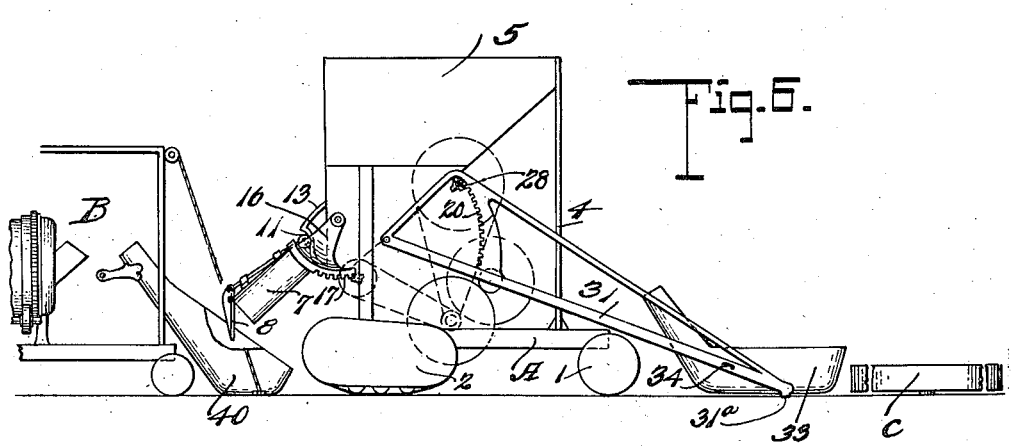

UNITED STATES PATENT OFFICE.

ERICH H. LICHTENBERG, OF MILWAUKEE, WISCONSIN, ASSIGNOR TO KOEHRING MACHINE COMPANY, OF MILWAUKEE, WISCONSIN.

LOADING AND MEASURING APPARATUS.

1,287,711.   Specification of Letters Patent.   Patented Dec. 17, 1918.

Application filed December 23, 1916. Serial No. 138,692.

*To all whom it may concern:*

Be it known that I, ERICH H. LICHTENBERG, a citizen of the United States, residing at Milwaukee, in the county of Milwaukee and State of Wisconsin, have invented certain new and useful Improvements in Loading and Measuring Apparatus, of which the following is a specification.

This invention has to do with loading and measuring apparatus, and preferably comprises a portable type of such apparatus adapted to be used for facilitating the handling of materials such as stone and sand, quite commonly employed as concrete aggregates.

In concrete pavement, road and similar building operations, as is well known, it is customary to employ portable means for mixing the various aggregates, said means being advanced as the work proceeds. It is furthermore common today in connection with the above work to unload and deposit on the ground adjacent to the building operation, and at intervals, the stone and sand aggregates needed for the pavement or road building purposes. It is then customary to haul the aggregates to the portable mixing means in wheel barrows, a method of handling the materials which is time consuming and expensive to the contractor, for obvious reasons.

The portable loading and measuring apparatus of the improvements hereinafter set forth more in detail is especially designed to eliminate the necessity of depositing aggregates upon the ground and afterward hauling them, or throwing them as by shoveling, to the apparatus by which they are mixed preparatory to being finally deposited as concrete.

With a view to the accomplishment of the above end therefore, I have designed my loading and measuring apparatus in such a manner that it comprises a main receptacle or hopper into which the aggregates such as stone and sand may be directly dumped from the wagons or vehicles conveying the same to the site of the particular erection. The said hopper or receptacle is divided in such a manner as to maintain the different aggregates in separate compartments, and each compartment is equipped with a combination discharge chute and measuring receptacle into which the materials of said compartment may be fed and afterward discharged in measured quantities so as to be directly received by any other apparatus which is to act upon the materials for the purposes of the building operation in connection with which the apparatus is used.

While the apparatus of the invention is especially useful in connection with pavement and road building operations where portable mixing machines are almost indispensable, it will be obvious that the portability of my apparatus enables it to be employed in other building operations, and furthermore I do not wish to be confined as regards the scope of my invention to the employment of the special instrumentalities hereinafter described on a portable machine since said instrumentalities are also advantageous for use when mounted upon a stationary support.

For a full understanding of the present invention, reference is to be had to the following description and the accompanying drawings, in which:—

Figure 1 is a side elevation showing a portable loading and measuring apparatus embodying the essential features of the invention, dotted lines illustrating the measuring receptacle and chute in open position;

Fig. 2 is a sectional view partly broken away, looking toward the portable apparatus from the loading end of the same;

Fig. 3 is an end elevation looking toward the apparatus in a direction opposite to that in which the view of Fig. 2 is taken;

Fig. 4 is a fragmentary side view partly broken away, illustrating more clearly the measuring receptacle and chute as when in closed position;

Fig. 5 is a sectional view showing the parts illustrated in Fig. 4, with the measuring receptacle and chute in discharging position;

Fig. 6 is a general side view, somewhat diagrammatic in its character, showing the preferred manner of use of the loading and measuring apparatus of the invention, in connection with other apparatus employed in building operations; and Fig. 7 is a sectional view taken about on the line 7—7 of Fig. 1.

Throughout the following detail description, and on the several figures of the drawings, similar parts are referred to by like reference characters.

Referring particularly to Fig. 1 of the drawings, it will be observed that in order to make my apparatus portable the loading and measuring means is preferably mounted upon a truck A equipped with suitable traction means including wheels 1 and caterpillar traction devices 2. Upon the truck A is mounted an engine 3 and I contemplate to provide suitable means, not shown, to connect the engine with the traction devices whereby the apparatus may be driven under its own power. In addition to this I utilize the motor 3 as a power device for operating certain of the loading, measuring and discharging instrumentalities mounted upon the truck and forming an essential feature of my invention.

On the truck A is provided a suitable framework 4 comprising vertical members, and said framework supports the loading or receiving receptacle 5. The receptacle 5 is in the form of a hopper having an inclined bottom $5^a$ so that the contents of the receptacle will gravitate downward therein and out of suitable discharge openings at the lower extremity of the receptacle. The receptacle 5 is divided into compartments by means of a partition 6, shown in dotted lines in Fig. 2, and while I have illustrated two compartments, a large one and a small one, I contemplate that a greater number of compartments may be employed if desired, or in some cases a single compartment would suffice for certain operations. The partition 6 may furthermore be adjustable in opposite directions toward the opposite sides of the receptacle or hopper 5 whereby to increase or decrease the volume of the respective compartments thereof. This adjustment is not shown being in the purview of mere mechanical skill.

As will be observed more particularly by reference to Figs. 2, 4 and 5, there are located at the lower discharge end of the receptacle 5 measuring receptacles 7 the upper ends of which are provided with openings $7^a$ to register with the lower discharge openings of the compartments of the hopper 5. Furthermore each of the receptacles 7 is equipped at its lower end with a door 8 pivoted at 9. Attached to each door 8 is a controlling member or rod 10 the lower end of which is fastened pivotally to an arm $8^a$ on the door the upper end having a roller 11 applied thereto arranged to traverse the cam surface 12 of a bracket 13 attached to the lower end of the hopper. Each bracket 13 is formed with a dwell $12^a$ in its cam surface 12 for a purpose to be later set forth. The controlling member or rod 10 is guided for movement relatively to the receptacles 7 with which it coöperates by means of guides 14 seen best in Figs. 4 and 3.

As seen best in Figs. 2 and 3, while the receptacles 7 are separate and distinct receptacles, they are preferably a part of a single body structure, the separation of which into the receptacles 7 is effected by the use of partitions 15, see Fig. 2, which partitions are adjustable in the body structure so as to separate the latter to provide receptacles 7. It is contemplated that the partitions 15 furthermore shall be adjusted in order to increase or decrease the volume of the compartment of either receptacle 7, and in this way the measured quantity of material to be handled by the receptacle is regulable for purposes of variation dependent upon the work required to be done so far as the measurement of the aggregates handled by the apparatus is concerned. The body structure in which the receptacles 7 are formed is designated $7^b$ and at the upper portion of said structure and at opposite sides are provided the hangers 16 pivotally connected with the sides of the hopper or receptacle 5 and enabling bodily movement of said structure $7^b$ comprising the receptacles 7. The said hangers 16 are equipped with the toothed sectors 17 forming rearward extensions thereof which sectors 17 are adapted to coact with spur gears 18 on an actuating shaft 19 which shaft 19 is connected by a sprocket 20 and sprocket chain 21 to a driving shaft 22 suitably mounted upon the truck A. Any suitable type of clutch means may be employed to transmit motion from the motor 3 to the drive shaft 22, whereby to correspondingly actuate the spur gears 18 and cause swinging movement of the receptacles 7 and their hangers 16. In this manner the hangers 16 and receptacles 7 may be swung from the closed position of Fig. 4 to the open position of Fig. 5, and vice versa. It is only required that power be required to open the receptacles 7, however, as they will gravitate to their closed positions in an obvious manner.

It is notable that the extensions of the hangers 16 on which the toothed sectors 17 are formed are so constructed and arranged as to provide bottom valves or closures 23 for the lower open ends of the compartments of the hopper 5, see Fig. 5.

With the parts constructed as above set forth, it will be obvious that by the proper application of power to the shaft 19 the sectors 17 may be actuated to cause pivotal movement in an outward upward direction of the receptacles 7. At a predetermined time in said movement the valves 23 close the lower discharging ends of the compartments of the hopper 5 and as soon as the receptacles 7 reach a position in which the rollers 11 enter the dwells $12^a$ of the cams 12 the pressure of the contents of each receptacle 7 will open the door 8 at the bottom of the receptacle and the contents will flow out of the same in the manner shown in Fig. 5. When the receptacles 7 are permitted to return to their closed positions the rollers 11 and rods 10 will automatically close the doors 8 through coöperation between the bars 11 and 12 and the upper receiving openings 7ᵃ of the receptacles 7 will be restored to registration with the lower discharge openings of the compartments of the hopper 5 whereupon the contents of the compartments of the hopper 5 will flow into the receptacles 7 sufficiently to fill these receptacles ready for another discharging operation of the measured quantity of materials received therein.

Reverting to Fig. 1, it will be observed that there is mounted on the driving shaft 22 a transmitting gear 24 engaging a driving gear 25 on the motor shaft 26. The said gear 24 being fixed to the shaft 22 establishes a driving connection between the shaft 22 and the motor, and a sprocket chain or belt 27 connects the shaft 22 with a shaft 28 mounted in bearings on the under side of the hopper 5, see Fig. 2. The shaft 22 has spur gears 29 at its opposite ends arranged to mesh with toothed sectors 30. The sectors 30 form parts of the side arms 31 pivoted at 32 to the under side of the hopper 5, which side arms 31 form lifting means for the loading skip or receptacle 33 supported between and upon the outer ends of said side arms. It will be obvious that the operation of the shaft 28 and consequent actuation of the gears 29 may be controlled by any suitable clutch means on the shaft 22 whereby the driving of the gears 29 may be effected to thereby raise the arms 31 of the lifting frame for the skip or loading hopper 33. The loading hopper 33 comprises a body portion having a chute extension 33ᵃ and as said hopper leaves the ground in the process of elevation it tilts about the axis established by pivots 34 intermediate the arms 31 and the hopper so that when the hopper reaches an upper dumping position the chute extension 33ᵃ will feed the materials from the receptacle 33 into one or the other of the compartments of the hopper 5. The pivots 34 are adjustable lengthwise of slots 35 in the arms 31, the opposite ends of the slots 35 being enlarged to receive the pivots in an obvious manner.

A cross bar 36 connecting the arms 31 forms a rest for the chute extension 33ᵃ of the member 33 at a predetermined point in the elevating movement of said member. Likewise, as shown in Fig. 7, the skip 33 is provided in the chute extension 33ᵃ thereof with a deflector 37 so arranged as to be shifted about a pivot 38 connecting it with the part 33ᵃ, whereby the materials may be caused to pass from the skip 33 into either one of the compartments of the hopper 5. Any suitable means may be used for holding the deflector 37 in either of its full and dotted line positions shown in Fig. 7 and spring catches 39 are illustrated as a conventional means for such purpose.

With a view to describing the preferred method of use of my apparatus I refer to Fig. 6 of the drawings in which is conventionally and somewhat diagrammatically illustrated a mixer B having its usual loading skip 40, the portable apparatus hereinbefore described being located so as to discharge into said skip 40 and there being associated with said apparatus a turn table C. With the various apparatuses arranged in the manner shown in Fig. 6, the vehicles conveying the aggregate materials such as stone and sand may be driven upon the turn table C, and turned upon the table so as to facilitate bodily dumping of the contents thereof into the loading hopper or skip 33. This done, the arms 31 may be operated by the motor 3 of my portable apparatus and the contents of the skip 33 discharged into the hopper 5. From the hopper 5 measured quantities of the stone, sand or other aggregates which happen to be loaded into the hopper 5 may be discharged into the loading skip 40 of the mixer B, by the operation of the receptacles 7 in the manner previously described. Obviously if my apparatus is used as above set forth the loss of time, and incidental expense of conveying the aggregates to the site of the use thereof, the depositing of them upon the ground, and the rehauling or reloading of them for treatment by suitable apparatus some distance away, are entirely avoided. I contemplate, of course, that the portable apparatus of my invention may be moved under its own traction to the place of use of the mixer or other associated apparatus, the portable apparatus being virtually a storage compartment holding sufficient aggregates to enable work to be carried on while fresh supplies of the aggregates are being hauled to the site of the building operation.

It will be observed that the arms 3 have rests 31ᵃ at their outer ends, the latter forming stop means to limit downward pivotal movement of the loading skip 33.

It will also be understood that while I contemplate the raising of the measuring devices 7 by power and that they may be lowered by gravity, I also contemplate the use of power to lower the member 7 to its normal or receiving position.

Having thus described the invention, what is claimed as new is:—

1. In combination, a portable storage receptacle comprising separate compartments and having suitable discharges for said compartments, loading means for said storage receptacle comprising a skip, and elevating means for said skip to carry the latter from a receiving position to a position in which it discharges into said storage receptacle, said skip comprising means for adjusting the same to deliver its contents into one or another of the compartments of the storage receptacle.

2. In combination, a storage receptacle comprising separate compartments and having suitable discharges for said compartments, loading means for said storage receptacle comprising a skip, and elevating means for said skip to carry the latter from a receiving position to a position in which it discharges into said storage receptacle, said skip comprising a deflector movably mounted thereon for directing the contents of the skip into one or another of said compartments of the storage receptacle.

3. In combination, a storage receptacle comprising separate compartments and having suitable discharges for said compartments, loading means for said storage receptacle comprising a skip, elevating means for said skip to carry the latter from a receiving position to a position in which it discharges into said storage receptacle, said skip comprising a deflector movably mounted thereon for directing the contents of the skip into one or another of said compartments of the storage receptacle, and means whereby to hold said deflector in one or another of the positions to which it may be adjusted.

4. In combination, a storage receptacle comprising separate compartments and having suitable discharges for said compartments, loading means for said storage receptacle comprising a skip, elevating means for said skip to carry the latter from a receiving position to a position in which it discharges into said storage receptacle, said skip comprising a chute extension for delivering the contents of the skip to the storage receptacle, and a deflector pivotally mounted at one end in said chute extension and shiftable so as to cause the materials of the skip to be fed into one or another of the compartments of the said receptacle, and means to hold the deflector in shifted position as described.

5. In combination, a storage receptacle divided into a plurality of compartments, loading means for said receptacle comprising a loading skip, said skip comprising adjustable means whereby the contents thereof may be directed into any one of the compartments of the said receptacle, and separate discharge devices for the compartments of the receptacle.

6. In a concrete mixer loading apparatus, the combination with a portable storage receptacle of relatively large capacity adapted to travel along with a mixer or like machine to supply materials thereto, and means dividing said receptacle into a plurality of compartments designed to contain different aggregates therein, of a loading device coacting with said receptacle whereby large loads of material dumped directly on the loading device, as from a wagon, may be loaded into the storage receptacle and contained therein until required to be supplied to the mixer or other machine, the relative sizes of the storage receptacle and loading device being such that the former has many times the capacity of the latter, and means associated with the storage receptacle whereby to discharge the contents of any one or more of its compartments as and for the purpose set forth.

In testimony whereof I affix my signature.

ERICH H. LICHTENBERG.